US009732723B2

(12) United States Patent
Orke (10) Patent No.: US 9,732,723 B2
(45) Date of Patent: Aug. 15, 2017

(54) REDUNDANT PRESSURE CONTROL (71) Applicant: ENERGREEN AS, Stavanger (NO)

(72) Inventor: Per Reidar Orke, Hafrsfjord (NO)

(73) Assignee: ZEROPEX GROUP LIMITED, Stavanger (NO)

( * ) Notice: Subject to any disclaimer, the term of this patent is extended or adjusted under 35 U.S.C. 154(b) by 0 days.

(21) Appl. No.: 14/768,638

(22) PCT Filed: Feb. 14, 2014

(86) PCT No.: PCT/EP2014/052950
§ 371 (c)(1),
(2) Date: Aug. 18, 2015

(87) PCT Pub. No.: WO2014/125087
PCT Pub. Date: Aug. 21, 2014

(65) Prior Publication Data
US 2015/0377208 A1 Dec. 31, 2015

(30) Foreign Application Priority Data

Feb. 18, 2013 (EP) ..................... 13155653

(51) Int. Cl.
*F03B 13/00* (2006.01)
*F03B 13/10* (2006.01)
(Continued)

(52) U.S. Cl.
CPC .............. *F03B 13/10* (2013.01); *E03B 7/075* (2013.01); *F01C 1/12* (2013.01); *F01C 17/00* (2013.01);
(Continued)

(58) Field of Classification Search
CPC ....................................... F03B 13/00

USPC ........................................... 290/52
See application file for complete search history.

(56) References Cited

U.S. PATENT DOCUMENTS 5,468,132 A * 11/1995 Snell .................... F03B 3/00
418/206.4
6,824,347 B2   11/2004 Maloney
(Continued)

FOREIGN PATENT DOCUMENTS

DE         19522515       1/1997
NO   EP 2767716 A1 *  8/2014  .............. F03B 13/00
(Continued)

OTHER PUBLICATIONS

Computer translation of DE19522515 A1.*
International Search Report for PCT/EP2014/052950, Completed by the European Patent Office on Jun. 30, 2014, 5 Pages.

Primary Examiner — Tho D Ta
(74) Attorney, Agent, or Firm — Brooks Kushman P.C.

(57) ABSTRACT

An electricity generating device comprising a housing; a first lobed rotor and a second lobed rotor rotatably arranged in a fluid passage enclosed by the housing such that the lobes of the first and the second lobed rotor intermesh to create a barrier between a high-pressure and a low-pressure side of the housing during operation of the device; a first electricity generator to which the first lobed rotor is coupled, the first electricity generator being capable of varying the load of the first lobed rotor; and a second electricity generator to which the second lobed rotor is coupled, the second electricity generator being capable of varying the load of the second lobed rotor. There is also provided a method of synchronizing rotational positions of a first lobed rotor coupled to a first electricity generator and a second lobed rotor connected to a second electricity generator in a turbine.

6 Claims, 5 Drawing Sheets (51) Int. Cl.
*F03D 3/02* (2006.01)
*F01C 1/12* (2006.01)
*F01C 17/00* (2006.01)
*E03B 7/07* (2006.01)
*F03C 2/08* (2006.01)
*F04C 18/08* (2006.01)
*H02K 7/18* (2006.01)
*H02P 9/00* (2006.01)
*F01C 13/00* (2006.01)
*E03B 1/02* (2006.01)

(52) U.S. Cl.
CPC ............... *F03B 13/00* (2013.01); *F03C 2/08* (2013.01); *F03D 3/02* (2013.01); *F04C 18/082* (2013.01); *H02K 7/1823* (2013.01); *H02P 9/008* (2013.01); *E03B 1/02* (2013.01); *F01C 13/00* (2013.01); *F05B 2260/845* (2013.01); *F05B 2270/1041* (2013.01); *Y02E 10/74* (2013.01)

(56) References Cited

U.S. PATENT DOCUMENTS

| | | | | |
|---|---|---|---|---|
| 2009/0312885 | A1* | 12/2009 | Buiel | H02J 3/32 700/297 |
| 2015/0086406 | A1* | 3/2015 | Stosic | F01C 1/16 418/201.1 |
| 2016/0003045 | A1* | 1/2016 | Fortini | F01C 1/126 418/197 |
| 2016/0040480 | A1* | 2/2016 | Evans | E21B 4/02 175/107 |
| 2016/0194975 | A1* | 7/2016 | Gardner | F01D 15/10 290/52 |

FOREIGN PATENT DOCUMENTS

WO 2008004880 1/2008
WO 2011102733 8/2011

* cited by examiner

REDUNDANT PRESSURE CONTROL

CROSS-REFERENCE TO RELATED APPLICATION

This application is the U.S. national phase of PCT Application No. PCT/EP2014/052950 filed on Feb. 14, 2014, which claims priority to EP Patent Application No. 13155653.2 filed on Feb. 18, 2013, the disclosures of which are incorporated in their entirety by reference herein.

TECHNICAL FIELD

The present disclosure relates to the field of fluid control and energy generation. In particular, it relates to controlling the water pressure and flow rate in a water distribution system and generating electrical energy from a differential pressure.

BACKGROUND

There often exists a need for regulating the fluid pressure and/or the fluid flow in fluid distribution networks. An example of such a fluid distribution network is a water distribution system used in cities for distributing drinking water from a central reservoir to a plurality of households and other water consumers. Such networks or systems typically comprise one or several main water lines or conduits that convey water from a reservoir or a pump station to different zones of the network. Each zone normally comprises a secondary water line or conduit which conveys water to different areas in the zone. In each such area a consumer distribution line supplies drinking water from the secondary conduit to each individual consumer within the area. Typically the pressure in the main conduits is around 10 bar, whereas the pressure in the individual consumer lines is kept at around 3 bar. Therefore the distribution network often comprises pressure reducing means which normally are arranged at the junctions between the main and secondary conduits and/or between the secondary conduits and the consumer lines. The pressure reducing means may however also be arranged within the main, secondary or the consumer line conduits. In other systems there may be arranged additional intermediate water line conduits operating at different pressures between the main water line and the consumer distribution lines. Traditionally the pressure reducing means are constituted by conventional pressure valves, which often are spring loaded or controlled by a pilot pressure. Another widely used method is to arrange break pressure tanks in the pipeline, to break pressure down to atmospheric pressure before gravity builds pressure in the downstream pipeline.

In order to be able to utilize the energy of the fluid, it has been suggested to provide the pressure reducing valve in such a water distributing network with a turbine which is arranged to capture energy which is released during pressure reduction. U.S. Pat. No. 6,824,347 B2 discloses such valve.

WO 2008/004880 discloses an apparatus that may be used as a turbine for reducing pressure in water distribution networks and efficiently producing electricity from the pressure difference when connected to a generator. Another benefit of the apparatus of WO 2008/004880 is that it is capable of controlling the flow and the downstream pressure. In other types of water turbines the downstream pressure is either atmospheric, or they cannot control flow or pressure (e.g. propeller-based turbines).

The apparatus of WO 2008/004880 has two impellers arranged on two parallel shafts. When it has been installed in water distribution networks, gears have been used for transferring the force between the two shafts and one of the shafts has been coupled to a generator connected to the power grid. Another function of the gears has been to synchronize the rotational movements of the two impellers. Thus, such gears are sometimes referred to as timing gears.

In case of a failure in the above installation, the impeller may begin to spin freely ("free spinning"). The consequence can be pressure bursts and surges, which can be damaging for the pipeline system. To handle the free spinning incidents, water bypass arrangements including pressure reduction valves have been installed. However, such bypass arrangements are expensive and require space, which often is limited in e.g. municipal water systems.

SUMMARY

It is on object of the present disclosure to provide a more efficient solution to the above-mentioned free spinning problem.

According to a first aspect of the present disclosure, there is thus provided electricity generating device comprising
 a housing;
 a first lobed rotor and a second lobed rotor rotatably arranged in a fluid passage enclosed by the housing such that the lobes of the first and the second lobed rotor intermesh to create a barrier between a high-pressure and a low-pressure side of the housing during operation of the device;
 a first electricity generator to which the first lobed rotor is coupled, the first electricity generator being capable of varying the load of the first lobed rotor; and
 a second electricity generator to which the second lobed rotor is coupled, the second electricity generator being capable of varying the load of to the second lobed rotor.

Further, according to a second aspect of the present disclosure, there is provided method of synchronizing rotational positions of a first lobed rotor coupled to a first electricity generator and a second lobed rotor connected to a second electricity generator in a turbine, said first and second lobed rotors being intermeshed, comprising controlling the first and/or the second generator to adjust a rotational position of the first lobed rotor relative a rotational position of the second lobed rotor to optimize the intermeshing of the lobes of the first and the second lobed rotors.

According to the second aspect, the optimization may be to control the generator(s) to avoid and/or minimize tearing contact between the lobes. In some embodiments, the optimization may however be to control the generator(s) to maintain contact between the lobes (slightly offset their relative position) to improve the sealing lines and thus increase efficiency. This may be at the cost of increased wear.

When the lobed rotors are coupled to one generator each according to the above aspects the free spinning problem is avoided in case of a broken shaft or a generator failure. If the shaft or the coupling between the first lobed rotor and the first generator is broken or if the first generator fails, the first lobed rotor will not rotate freely as it is intermeshed with the second lobed rotor. Instead, a higher load will be applied to the second lobed rotor and thus the second generator, which is selected to be capable of handling a double load for at least a shorter period, such as a couple of minutes, which may be enough to allow the water to be turned off, e.g. by an operator. Thus, a redundancy is introduced eliminating the coupling between the lobed rotor and the generator and the generator itself as single points of failure ("SPOFs"), which are undesirable in any system.

Two intermeshed lobed rotors in a turbine will synchronize themselves during operation. However, to transfer the energy from one lobed rotor to the other, physical interaction between the two is needed, which results in lifetime-shortening wear and efficiency-reducing friction. Therefore most, if not all, commercial lobe pumps and turbines having such lobed rotors comprise timing gears or timing belts arranged on the shafts synchronizing the lobed rotors. Also, the timing gears transfer energy between the shafts and one single generator converts the load on both shafts to electricity.

However, there are several disadvantages with the gears. Firstly, they need lubrication and the lubrication oil must be prevented from contaminating the fluid passing the turbine. This is particularly important when the fluid is drinking water. Also, the frequent changes of the lubrication oil that are needed increases maintenance cost and reduces availability. Secondly, the gears results in energy losses and wear problems. Thirdly, the gears and the fluid buffer chamber necessitate longer shafts that require more bearings, create higher bearing loads (causing wear problems and reducing the differential pressure capability) and result in a bigger device (as mentioned above, the available space at the sites of installation is often limited). The torsional forces building up in the shafts throughout the drive train do also apply uneven forces on the bearings, which contributes to reduced bearing life.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

DETAILED DESCRIPTION

As a first aspect of the present disclosure, there is thus provided an electricity generating device comprising a housing; a first lobed rotor and a second lobed rotor rotatably arranged in a fluid passage enclosed by the housing such that the lobes of the first and the second lobed rotor intermesh to create a barrier between a high-pressure and a low-pressure side of the housing during operation of the device; a first electricity generator to which the first lobed rotor is coupled, the first electricity generator being capable of varying the load of the first lobed rotor; and a second electricity generator to which the second lobed rotor is coupled, the second electricity generator being capable of varying the load of the second lobed rotor.

Each lobed rotor may for example comprise 2, 3, 4 or 5 lobes. The lobes are typically ridges generally extending along the length of the shaft if the lobed rotor is arranged on a shaft. The lobes/ridges may be straight. In such case, the volume displaced on both sides of the turbine varies with rotational lobe position. In addition, the area and geometry of the gap between the lobed rotors through which fluid may "leak" from the high-pressure side to the low-pressure side vary as the lobed rotors rotate. The varying degree of displacement and leakages over a period result in pressure variations in the fluid causing mechanical stress. In a worst case scenario, the pressure variations in the fluid match the natural frequency of the device and/or the piping system and structure it is connected to, which may lead to a severe mechanical failure.

If the lobes are helical, the volume displacement is normally eliminated and the characteristics of the gap exposed to the passing fluid vary to a smaller degree with the rotation of the lobed rotors. Therefore, it is preferred that the lobes of the first and the second lobed rotors are helical.

The present invention is applicable to any type of device having intermeshed rotors. Thus, the intermeshed lobed rotors of the present disclosure may be replaced by intermeshed impellers or intermeshed blade wheels.

As explained above, the coupling of one generator to each lobed rotor introduces a redundancy in the system that substantially reduces the risk of free spinning as both generators or both coupling between lobed rotors and generators are unlikely to fail at the same time.

This concept of redundancy may be taken further. Both generators may be coupled to a common variable-frequency drive (VFD). However, such a common VFD would be a single point of failure (SPOF). That is, if the function of the common VFD fails, the entire system may fail resulting in free spinning of the lobed rotors. Therefore, it is preferred that each generator is connected to an independent VFD. If one VFD controlling the first generator and thus the first lobed rotor fails, the other VFD may still control the second generator and the second lobed rotor and thus prevent free spinning.

The VFDs of the present disclosure may be dual front-end VFDs. A dual front-end VFD is controlling the generator, delivering DC energy to a DC bus. Further, it takes DC energy from the DC bus and converts into grid voltage and frequency. Thus, a dual front-end VFD is a unit of two VFDs and a DC bus. The components of the dual front-end VFD may be contained in a single housing and handled as one system.

Instead of using a dual VFD, two separate VFD's may be arranged with a separate DC bus in between.

The VFDs connected to the generators are arranged to send drive signals to the generators. The drive signals thus control the braking force applied in the generators.

A controller may be arranged to send a control signal relating to the VFD. Alternatively, the controller may be integrated in the VFD. Again, a single controller may be arranged to send control signals to both VFDs, but preferably, two controllers are arranged to send control signal to the VFDs to to eliminate yet another SPOF. In one embodiment, both VFDs are connected to both controllers. In another embodiment, each VFD is connected to an independent controller.

Further, a VFD and a controller according to the present disclosure may be one common device. Such devices having the functions of the controller and the VFD are commercially available.

The control signal sent to the VFD(s) relate to the operation of the two lobed rotors. A control signal may for example depend on a reading of a rotational position of the first lobed rotor relative a rotational position of the second lobed rotor. That is, the controller(s) may receive (a) feed-back signal(s) from the turbine. Thus, the device of the first aspect may comprise at least one apparatus being coupled to at least one of the controllers and arranged to read a rotational position of the first and/or the second lobed rotor and send a feed-back signal to the controller(s). Such an apparatus may for example be an encoder. Thus, the absolute rotational position of the respective lobed rotors may be read to calculate their relative rotational positions.

Alternatively, the rotational positions of the lobed rotors relative each other is read directly. As explained above, the control signal may then synchronize the lobed rotors by controlling one or both generators, via the VFD(s), to adjust the rotational position of the first and/or second lobed rotors. Thereby software synchronization of the device is achieved and synchronization by timing gears, which may be associated with a number of drawbacks (see above), is not necessary.

Preferably, a first encoder coupled to the controller(s) is arranged to read the absolute rotational position of the first lobed rotor and a second encoder coupled to the controller(s) is arranged to read the absolute rotational position of the second lobed rotor.

As an alternative or complement to reading the rotational positions of the lobed rotors, the device may comprise a pressure sensor coupled to the controller(s). The readings of such a pressure sensor may be an indirect to measure of the state of the synchronization, wherein deviating pressure variations, such as higher pressure variations than what is normal, in the device indicate that the lobed rotors are out of sync. The controller provided with such readings may control the generators (via the VFDs) to adjust the relative rotational positions of the lobed rotors. Readings of normalized (e.g. decreased) pressure variations in such an embodiment are a confirmation of successful control or at least that the adjustments were made in the right direction. Thus, the pressure sensor may be used both for diagnosis and feed-back during adjustments. Gyro sensors sensing shakings of the device may be used for the same type of indirect readings as the pressure device. A precise flow measurement can also be used for the same type of indirect readings.

Further, the generators may be coupled to a power grid, normally via their respective VFDs. A single connection between the device of the first aspect and the power grid is considered to be another SPOF. Therefore, the device may have two different connections for supplying electricity to a power grid. In the embodiment where each generator is coupled to a VFD, the respective VFDs may each have a connection for independently connecting them to the power grid. Accordingly, such an embodiment may also be part of a system further comprising a power grid and two independent connections between the respective VFDs and the power grid.

The power grid is also a SPOF. The apparatuses and installations tied to the power grid consume energy and constitute a load for the generators. At power failure in the power grid, sometimes referred to as grid loss, the load is suddenly reduced, which may result in free spinning. At grid loss there are several ways to stop or decelerate the turbine.

It is known in the art to use a so-called electrical load resistor, also known as a brake resistor, to stabilize a generator at a grid loss until the generator is stopped in other ways. An electrical load resistor comprises at least one electrical element, which may be a resistor, an induction element or a capacitor. This electrical element works as a load on the generator. The electrical element is normally arranged to be cooled by a fluid such as air, water or oil. An electric element has the advantage that it may be quickly employed at grid loss. Several types of directly connected electrical elements are known in the art. Principally they consist of a resistor that during use heats a cooling fluid such as air, freshwater, seawater or oil, such as transformer oil that transfers the heat to air or water in a heat exchanger.

The device of the first aspect shall preferably be capable of supplying water at a desired rate and pressure also during long-term grid loss. An electrical load resistor for such a situation is described in WO 2011/102733 A1.

The electrical load resistor may not only be employed at total grid loss, but also in situations when the energy consumption on the grid is too low to create the load necessary for meeting a desired fluid pressure downstream of the device. Another situation is when an active disconnect is required due to local grid owner or national grid requirements on e.g. grid frequency, grid rate-of-change-of-frequency (ROCOF) or under/over voltage.

As understood from the above, the device of the first aspect is particularly suited for a water distribution system. As a configuration of the first aspect of the present disclosure, there is thus provided a water distribution system, such as a municipal water distribution system, comprising at least one device according to first aspect. The water distribution system normally requires several pressure reductions to meet the pressure specifications for its different parts. In an embodiment of the configuration, the water distribution system may thus comprise a plurality of devices according to the first aspect. The device(s) of the water distribution system may be connected to a power grid. Normally, the water distribution also comprises water pipes and possibly tanks, such as water storage tanks. The device of the first aspect may for example be arranged where a pipe ends in a tank ("end-of-pipe" arrangement) to convert the remaining overpressure in the water to electrical energy before the water is stored in the tank. In such an embodiment, the controller(s) may be arranged to control the level in the tank. Such control may be based on measurements of the water level in the tank. Such measurements may be performed by a pressure transducer that is arranged on the downstream side of the device and coupled to the controller(s). Also, the device may be arranged between two pipe sections to set the water pressures according to specification of the water distribution system. In an "end-of-pipe" arrangement, yet another mode of operation is to optimize on energy production.

Also, there is provided a use of a device according to the first aspect for generating electricity from water flowing through the device, e.g. in a water distribution system, such as a municipal water distribution system. Preferably, the use is also for controlling the water pressure upstream and/or downstream of the device, or flow control.

As a second aspect of the present disclosure, there is provided a method of synchronizing rotational positions of a first lobed rotor coupled to a first electricity generator and a second lobed rotor connected to a second electricity generator in a turbine, said first and second lobed rotors being intermeshed. The method comprises controlling the first and/or the second generator to adjust a rotational position of the first lobed rotor relative a rotational position of the second lobed rotor to optimize the intermeshing of the lobes of the first and the second lobed rotors.

As mentioned above, the rotational position of the first lobed rotor relative the rotational position of the second lobed rotor may be adjusted to minimize or avoid tearing contact between the lobes.

Alternatively, the rotational position of the first lobed rotor relative the rotational position of the second lobed rotor may be adjusted to maintain contact between the lobes to improve the sealing (and thus reduces leakages) between the high-pressure side and the low-pressure side of the turbine.

The benefits of the method of the second aspect are evident from the above discussion in connection with the first aspect. Further, the various embodiments of the first aspect apply to the second aspect mutatis mutandis.

However, some features and embodiments of the method are anyway discussed below.

As explained above, timing gears have traditionally been used for synchronizing impellers or rotors. In the method of the second aspect, no timing gears are necessary and according to a preferred embodiment of the first or second aspect, the turbine comprises no timing gears. Instead, one or both of the generators are controlled to adjust the relative rotational positions of the lobed rotors. Hence, the adjustment may be made by the first or the second generator.

According to a preferred embodiment of the second aspect, the method further comprises reading a rotational position of the first and/or the second lobed rotor. In such an embodiment, the controlling of the generator(s) is based on the reading. After the control/adjustment has been executed, the position(s) of the lobed rotor(s) may be read again to validate that the relative positions of the lobed rotors are correct. If not, another round of control/adjustment and position reading may be performed.

In an alternative or complementing embodiment, the method may comprise sensing a pressure in the turbine and controlling the generator based on said sensed pressure. In another alternative or complementing embodiment, the method may comprise sensing turbine movements (shakings) and controlling the generator based on said sensed movements. As discussed above, high pressure variations or forceful movements are indicative of the lobed rotors being out of sync.

There is further provided a computer program that when run on a controller, causes the controller to send control signals for performing the method of the second aspect. A computer program product comprising a computer program of the present disclosure and a computer readable means on which the computer program is stored is also provided.

Exemplary Embodiments

Figure 1:
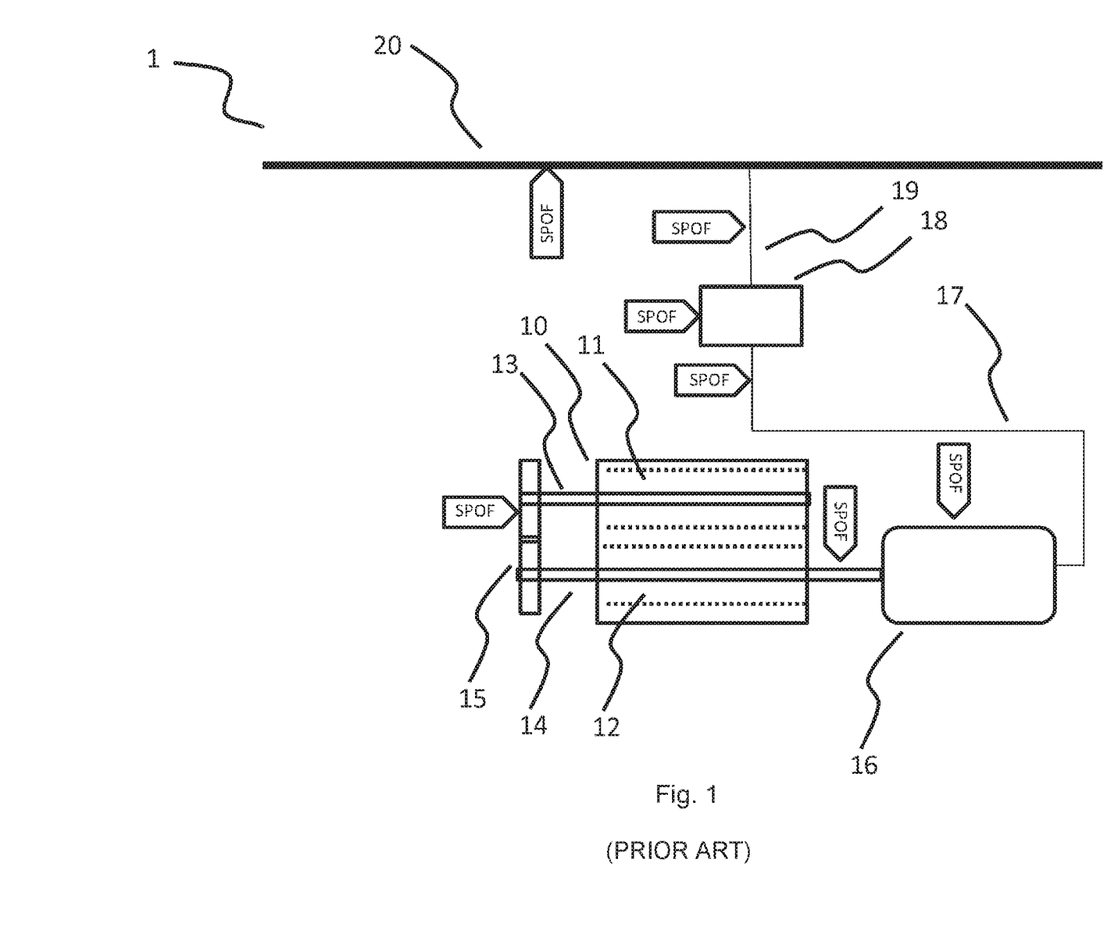
FIG. 1 is a schematic representation of a prior art electricity generation system.

FIG. 1 shows a prior art electricity generation system 1, comprising a turbine housing 10 in which two rotors 11, 12 are arranged on two shafts 13, 14. The two shafts 13, 14 are geared by timing gears 15. One of the shafts 14 is coupled to an electricity generator 16. There is a connection 17 between the generator 16 and a dual variable-frequency drive (VFD) 18. There is also a connection 19 between the dual VFD 18 and a power grid 20.

FIG. 1 further shows all single points of failure (SPOFs) identified in the system. Failure in any of these will lead to loss of control and free spinning rotors. The consequence can be pressure bursts and surges, which can be damaging for the pipeline system.

The SPOFs are thus:
the timing gears 15,
the shaft 13,
the shaft 14 coupled to the generator 16;
the generator 16 itself;
the connection 17 between the generator 16 and the dual VFD 18;
the dual 18 itself;
the connection 19 between the dual VFD 18 and the power grid 20; and
the power grid 20 itself.

Figure 2:
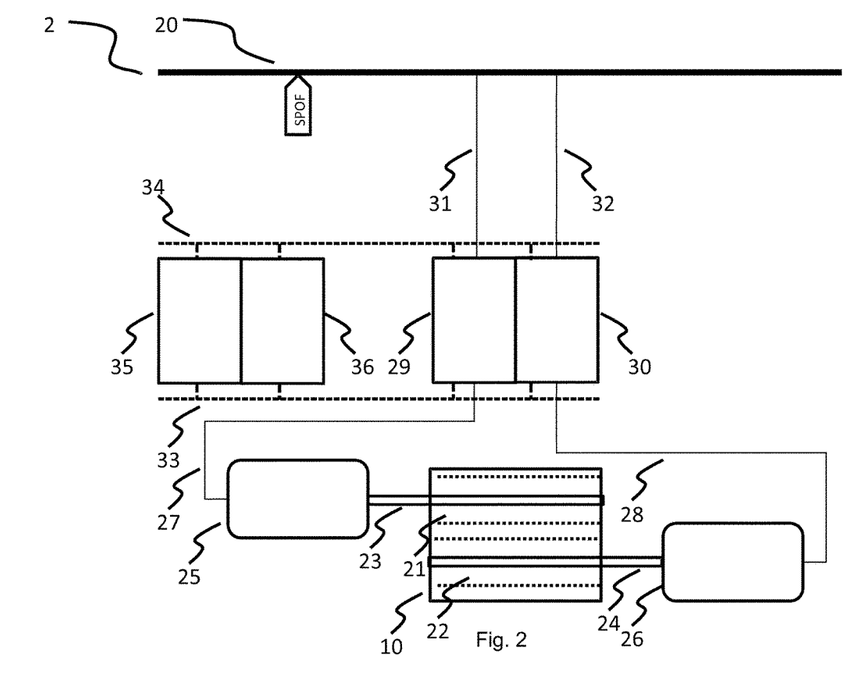
FIG. 2 is a schematic and non-limiting representation of an embodiment of a system according to the present disclosure.

FIG. 2 shows a non-limiting electricity generation system 2 according to the present disclosure connected to a power grid 20. The system comprises a turbine housing 10 in which two lobed rotors 21, 22 are arranged on a first and a second shaft 23, 24. The two shafts 23, 24 are not geared by timing gears. Instead, the respective shafts 23, 24 are coupled to one electricity generator 25, 26 each. There is a connection 27 between the first generator 25 and a first dual variable-frequency drive (VFD) 29 and another connection 28 between the second generator 26 and a second dual variable-frequency drive (VFD) 30. A first grid connection 31 connects the first dual VFD 29 to the power grid 20 and a second grid connection 32 connects the second dual VFD to the power grid 20. A first controller connection 33 connects a first controller 35 and a second controller 36 to both the first dual VFD 29 and the second dual VFD 30. Optionally, a second controller connection 34 independently connects the first and the second controller 35, 36 to both the first and the second dual VFD 29, 30.

Figure 3:
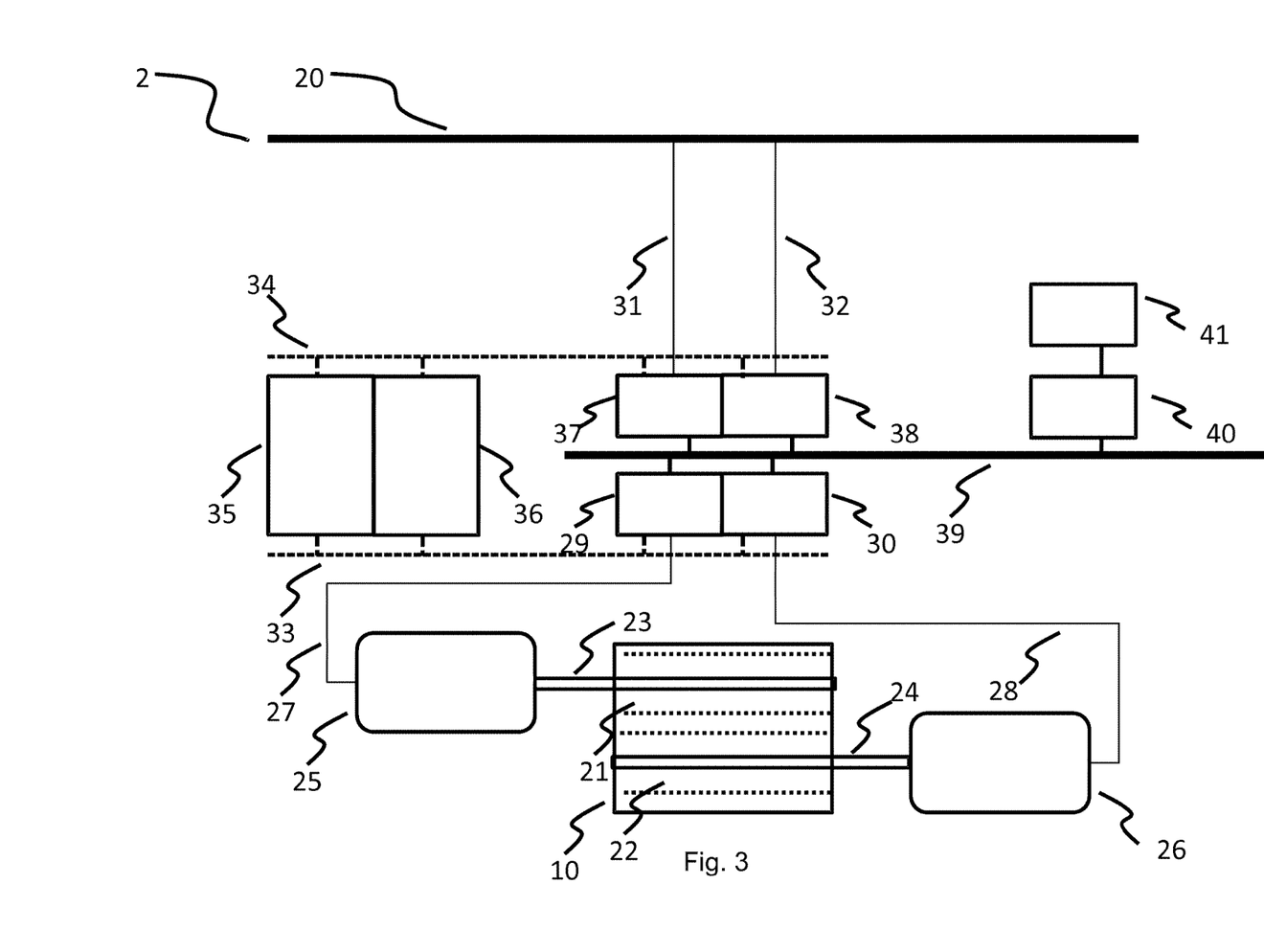
FIGS. 3 and 4 are schematic and non-limiting representations of more elaborate embodiments of a system according to the present disclosure.

In the system according to FIG. 2, the power grid 20 is the only SPOF. As shown in FIG. 3, the (single) VFDs 29, 30, 37, 38 may be connected to an electrical load resistor 41 via a DC bus 39 arranged between the VFDs and a load connection comprising a chopper 40 to eliminate this last SPOF. If the grid fails, the DC voltage will quickly build up on the DC bus. The chopper is arranged to respond on a DC bus voltage level, and consume the excessive energy in capacitors. When the capacitor is full, the energy is released to the load bank. Hence, it consumes DC energy, and it pulses energy to the load resistor. This will allow the VFDs to maintain control of the generators 25, 26 in case of a failure in the power grid 20. Air or water may for example be supplied to the electrical load resistor 41 for cooling.

Figure 4:
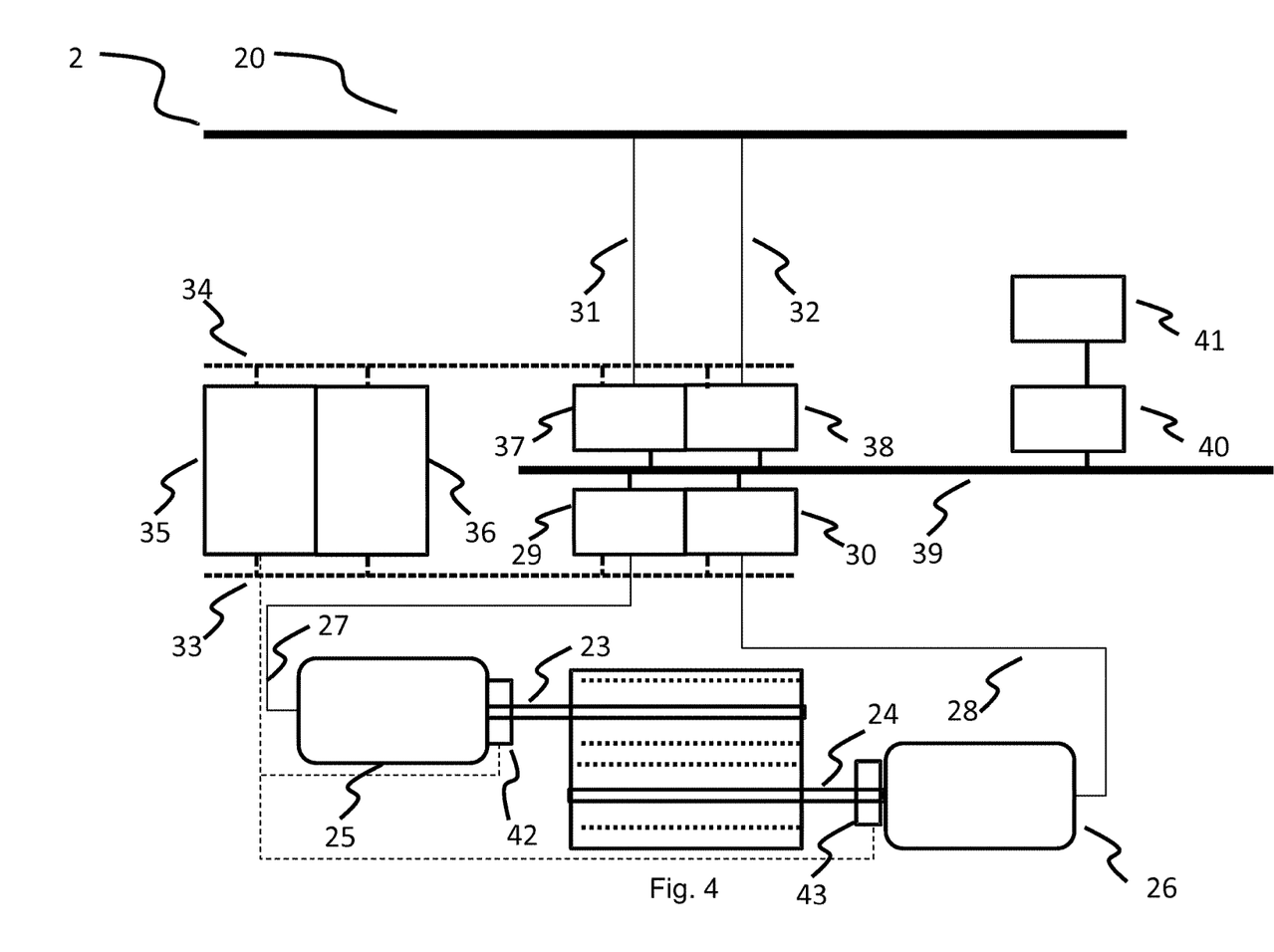

In the system shown in FIG. 4, a first encoder 42 is arranged to read a rotational position of the first lobed rotor 21 and a second encoder 43 is arranged to read a rotational position of the second lobed rotor 22. The encoders 42, 43 are connected to the controllers, which send control signals to the VFDs, which in turn control the generators 25, 26 to synchronize the lobed rotors 21, 22.

Figure 5:
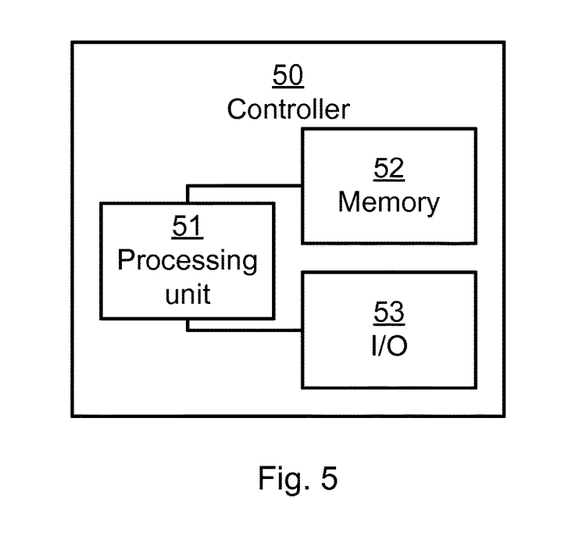
FIG. 5 is a schematic representation of the components of a controller.

FIG. 5 schematically illustrates, in terms of a number of functional modules, the components of a controller 35, 36, 50. A processing unit 51 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 61 (as in FIG. 6), e.g. in the form of a memory 52. Thus the processing unit 51 is thereby arranged to execute methods as herein disclosed. The memory 52 may also comprise persistent storage, which, for example, can be any single one or combination of magnetic memory, optical memory, solid state memory or even remotely mounted memory. The controller 35, 36, 50 may further comprise an input/output (I/O) interfaced 53. The processing unit 51 controls the general operation of the controller 35, 36, 50, e.g. by sending signals to the I/O interface 53 so as to control other entities and devices and to acquire data received by the I/O interface 53, e.g. from an encoder 41, 42. Other components, as well as the related functionality, of the controller 35, 36, 50 are omitted in order not to obscure the concepts presented herein.

Figure 6:
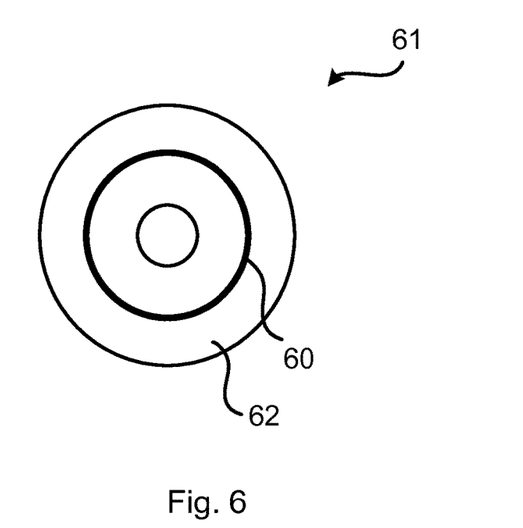
FIG. 6 shows a computer program product depicted as an optical disk.

FIG. 6 shows one example of a computer program product 61 comprising computer readable means 62. On this computer readable means 62, a computer program 60 can be stored, which computer program 60 can cause a processing unit 51, and thereto operatively coupled entities and devices, such as the memory 52 and/or the I/O interfaced 53 to execute methods according to the present disclosure (see FIG. 5). In the example of FIG. 6, the computer program product 61 is illustrated as an optical disc, such as a CD (compact disc) or a DVD (digital versatile disc) or a Blu-Ray disc. The computer program product 60 could also be embodied as a memory 52, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 60 is here schematically shown as a track on the depicted optical disk, the computer program 60 can be stored in any way which is suitable for the computer program product 61.

The invention claimed is:

1. An electricity generating device comprising a housing; a first lobed rotor and a second lobed rotor rotatably arranged in a fluid passage enclosed by the housing such that the lobes of the first and the second lobed rotor intermesh to create a barrier between a high-pressure and a low-pressure side of the housing during operation of the device;
a first electricity generator to which the first lobed rotor is coupled, the first electricity generator being capable of varying the load applied to the first lobed rotor;
a second electricity generator to which the second lobed rotor is coupled, the second electricity generator being capable of varying the load applied to the second lobed rotor;
at least one variable-frequency drive coupled to the first and the second generator; and
at least one controller coupled to the at least one variable-frequency drive and arranged to send a control signal relating to operation of the two lobed rotors to the variable-frequency drive;
wherein a variable-frequency drive and a controller may be one common device and wherein the variable frequency drive(s) is/are connected to an electrical load;
wherein the first generator is coupled to a first variable frequency drive and the second generator is coupled to a second variable-frequency drive and with the variable frequency drives are coupled to a common controller; and
wherein the first variable frequency device comprises a first grid connection and the second variable frequency device comprises a second grid connection such that the first and the second variable frequency device may be independently connected to a power grid.

2. The device according to claim 1, wherein the variable frequency drive(s) is/are connected to the electrical load via a DC bus arranged between the variable frequency drive(s) and a chopper 40.

3. The device according to claim 1, wherein the first and the second generator are coupled to a common variable-frequency drive.

4. The device according to claim 1, further comprising at least one apparatus, such as an encoder, arranged to read a rotational position of the first and/or the second lobed rotor and, said at least one apparatus being coupled to the at least one controller.

5. The device according to claim 1 wherein the first lobed rotor is arranged on a first shaft coupled to the first electricity generator and the second lobed rotor is arranged on a second shaft coupled to the second electricity generator.

6. A device in a water distribution system for controlling a flow rate or a water pressure upstream and/or downstream of the device and generating electricity from the water flowing through the device, which device comprises:
a housing;
a first lobed rotor and a second lobed rotor rotatably arranged in a fluid passage enclosed by the housing such that the lobes of the first and the second lobed rotor intermesh to create a barrier between a high-pressure and a low-pressure side of the housing during operation of the device;
a first electricity generator to which the first lobed rotor is coupled, the first electricity generator being capable of varying the load applied to the first lobed rotor;
a second electricity generator to which the second lobed rotor is coupled, the second electricity generator being capable of varying the load applied to the second lobed rotor; at least one variable-frequency drive coupled to the first and the second generator; and at least one controller coupled to the at least one variable-frequency drive and arranged to send a control signal relating to operation of the two lobed rotors to the variable-frequency drive, wherein a variable-frequency drive and a controller may be one common device.

* * * * *